Nov. 17, 1970  W. HILBURGER  3,541,512
ERROR DETECTING CONTROL ARRANGEMENT
Filed July 20, 1967  5 Sheets-Sheet 2

INVENTOR
Walter Hilburger
BY Michael S. Striker
ATTORNEY

INVENTOR
Walter Hilburger

BY Michael S. Striker
ATTORNEY 3,541,512
ERROR DETECTING CONTROL ARRANGEMENT
Walter Hilburger, Nurtingen, Wurttemberg, Germany, assignor to Metabowerke KG Closs, Rauch & Schnizler, Nurtingen, Wurttemberg, Germany
Filed July 20, 1967, Ser. No. 654,790
Claims priority, application Germany, Oct. 20, 1966, M 71,344
Int. Cl. H04q 9/00
U.S. Cl. 340—147                    14 Claims

ABSTRACT OF THE DISCLOSURE

A control arrangement has a multi-step counter, coincidence gates having one input each connected to the output of a corresponding counter step, and a second input connected to control switches operated by the members of the system to be controlled during different phases of the operating cycle and furnishing control signals. The counter is advanced one step by each control signal. Activators for activating the corresponding members of the controlled system receive a signal when both inputs of a corresponding coincidence gate receive signals simultaneously.

BACKGROUND OF THE INVENTION

This invention relates to control arrangements for systems having cooperating members undergoing operating cycles. In particular, it relates to control arrangements made up of standard blocks, wherein the arrangement may be changed to achieve different sequences of operation or to accommodate different systems, simply by changing the interconnection between said standard blocks.

Conventional electrical control arrangements are known which consist of low current relays and switches. This type of control leads to problems with respect to the life and reliability, since the contacts become inoperative in the course of time and by possible overloads. On the other hand, in the field of data processing, as for example in computers, so-called logic blocks are used which are usually transistorized. The basic circuit in these control arrangements is generally a transistor in a common emitter connection. The basic logic blocks, as for example NOR gates, OR gates, and AND gates may then be combined to form storage units, monostable multivibrators, astable multivibrators, flip-flops, etc. For purposes of miniaturization, integrated circuits are usually used. Also, generally a very high switching speed is used. However, integrated circuits have low control and output levels, and are subject to increasing noise interference with increasing switching speed.

SUMMARY OF THE INVENTION

It is the object of this invention to furnish a control arrangement which is reliable and has a long operating life. This is to be accomplished with a minimum of equipment, while still permitting a free program choice.

Thus, this invention comprises a control arrangement for systems, having cooperating members undergoing respective operating cycles each having a plurality of phases. The control arrangement comprises control signal generating means for generating control signals in dependence on the phase in the operating cycle of one or more corresponding ones of said cooperating members. There are also counting means for counting said control signals and generating counting signals at successive counting outputs. A plurality of coincidence means, each having first input connected to a corresponding one of said counting outputs and a second input connected to at least one of said control signal generating means, is responsive to substantially simultaneous reception of a signal at both said first terminal and said second terminal. These coincidence means then furnish an activation signal upon such simultaneous receipt of signals. A plurality of activating means, each responsive to a preselected one of said activation signals then activate the cooperating member of the controlled system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
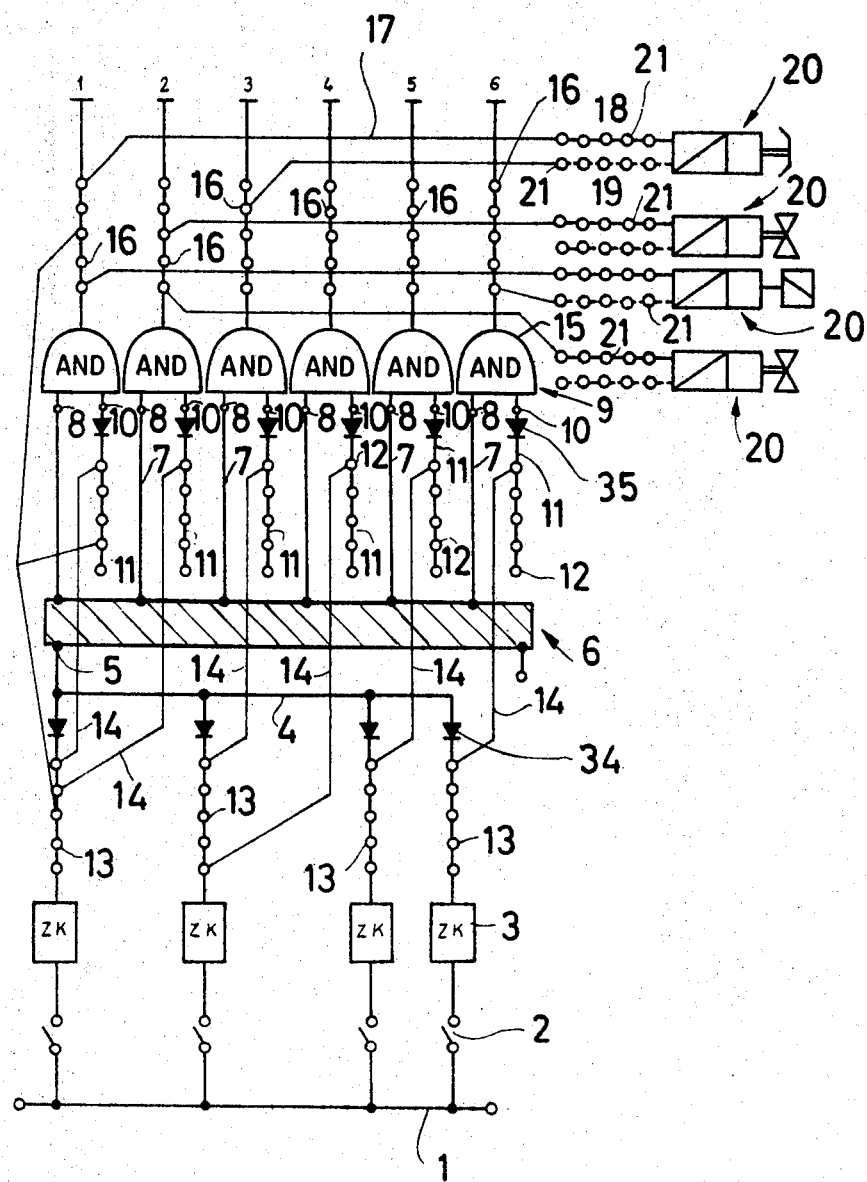
FIG. 1 is a circuit diagram of the control system.

Referring first to FIG. 1, as many control signal generating means 2, as needed for a given problem, are connected to a voltage bus line 1. These control signal generating means may be switches indicating end of travel of a member, may be induction coils, light barriers, or any other suitable means. These control signal generating means 2 are connected to pulse generating means, here shown as monostable multivibrators( 3, which furnish standard pulses upon receipt of control signals. The output of the multivibrators 3 are all connected jointly over conductor 4 to the counting input 5 of a counter, 6, having a plurality of counting steps. From each counting output of the counting means 6, a conductor 7 leads to a corresponding first input 8 of coincidence means 9, which are here shown as AND gates but could, alternatively, be constructed of three NOR blocks. The second input to each coincidence means, namely inputs 10, are each connected to multiterminal interconnecting means, in this illustration the connecting line 11 having plug-in units 12. Furthermore, additional multiterminal interconnecting means, namely plug-in units 13, are connected between line 4 and the multivibrators 3, to allow a sufficient number of interconnection possibilities via lines 14 between the lines 11 and the output of the multivibrators 3. Second additional multiterminal connecting means 16 are also provided. In this particular embodiment, they are also plug-in units and connect the output 15 of the coincidence means 9 with a distribution arrangement. Conductors 17 connect these plug-in units 16 to appropriate set or reset terminals 18 and 19 respectively of storage means 20. The storage means may be switches controlling the activating means. Further multiterminal interconnecting means, in FIG. 1 again plug-in units, are provided at both the set and reset terminals 18 and 19, respectively. These are numbered 21 in FIG. 1. The number of coincidence means 9 provided coincides with the number of possible program steps.

Figure 2:
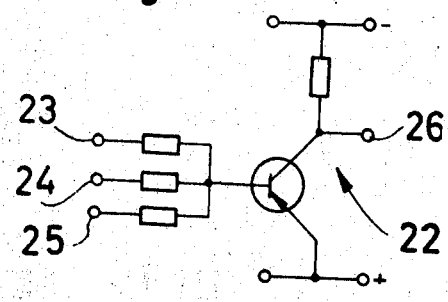
FIGS. 2 and 3 are, respectively, the circuit diagram and a symbolic diagram of a NOR circuit.
Figure 3:
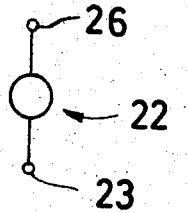
Figure 4:
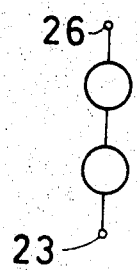
FIG. 4 is the symbolic representation of an OR circuit without inversion.
Figure 5:
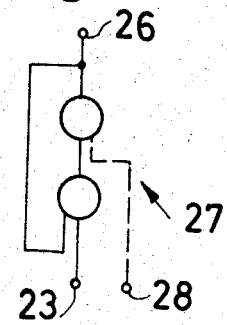
FIGS. 5 and 6 are, respectively, a circuit and symbolic representation of a storage unit.
Figure 6:
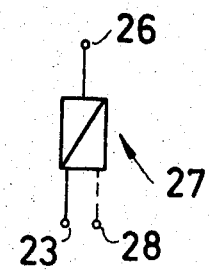

The operation of the control system shown in FIG. 1 is as follows. First control signal generating means 2 generate a signal, counter 6 is advanced by one step and a pulse corresponding to this counting step reaches the coincidence means 9. The coincidence means will generate an activation signal at the output 15 only if a pulse appears simultaneously at the second input 10. The activation signal is then conducted by conductor 17 to either the set input 18 or the reset input 19 of one of the storage means 20. These signals appear only when pulses appear both at first input 8 and second input 10 of the coincidence means, that is only for the corresponding program step can the corresponding activating means and thus the corresponding phase of the operating cycle be initiated. The interconnection of the plug-in units 13 with the plug-in units 12 and 6 as well as the plug-in units 16 with plug-in units 21 is determined to fulfill the particular requirements of a system to be controlled. NOR building blocks 22 may be used for contactless switching as shown in FIGS. 2 and 3. A common emitter type transistor connection is used, resulting in signal reversal. If a signal input appears at input terminals 23, 24, 25, no signal appears at output terminal 26 and vice-versa. If two such NOR blocks are series connected as in FIG. 4, no signal reversal takes place. A signal at input 23 results in a signal at output 26. If the output signal is sent back to the input, a storage unit results. Such a storage unit 27 is shown in FIG. 5 and FIG. 6. Again, the input is numbered 23 and the output 26, while a special reset input is labeled 28.

Figure 7:
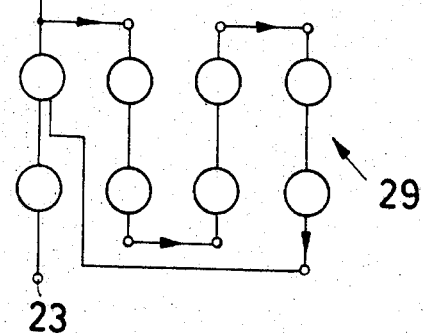
FIGS. 7 and 8 are, respectively, a circuit and symbolic representation of an astable multivibrator.
Figure 8:
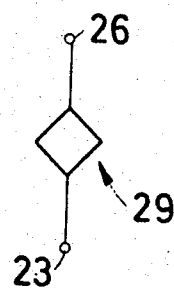
Figure 9:
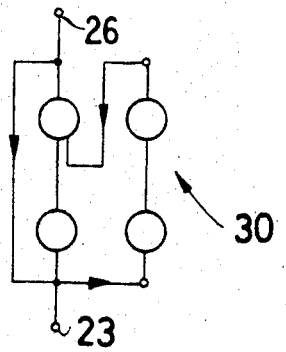
FIGS. 9 and 10 are, respectively, circuit and symbolic representations of a monostable multivibrator.
Figure 10:
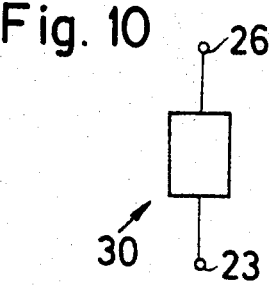
Figure 11:
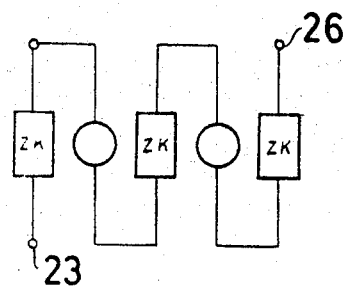
FIG. 11 is an arrangement for obtaining a delayed pulse output.

If as shown in FIGS. 7, 8, NOR gates are connected in series, an astable multivibrator 29 results which is also shown in symbolic form in FIG. 8. A continuous signal applied at input 23 results in a pulse train at output 26. The frequency is dependent on the number of elements used. In similar fashion, as shown in FIG. 9, a monostable multivibrator 30 may be built of, for example, four NOR blocks. This is shown symbolically in FIG. 10. If a signal appears at input 23, a time limited pulse appears at output 26. Finally, a signal delay may be obtained by a switching arrangement according to FIG. 11, where application of a continuous signal at input 23 results in a pulse appearing at output 26 only after a predetermined delay time. This delay time is proportional to the number of elements. In similar fashion, a signal may be stretched according to the arrangement shown in FIG. 12. After application of a continuous signal at input 23, a pulse appears at output 26, whose duration is proportional to the number of intervening elements.

Counting means 6 can be a standard counter built in for example transistor resistor logic.

Decoupling diodes 34 are interposed between the outputs of the monostable multivibrators 3 and the input 5 (or 32) of the counter 6. Also additional decoupling diodes 35 are connected to the inputs 10 of the coincidence means, to prevent a back coupling to other steps.

Figure 12:
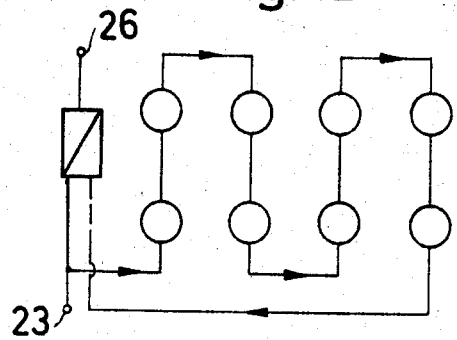
FIG. 12 is an arrangement for obtaining a pulse width proportional to the number of logic units in the arrangement.
Figure 12A:
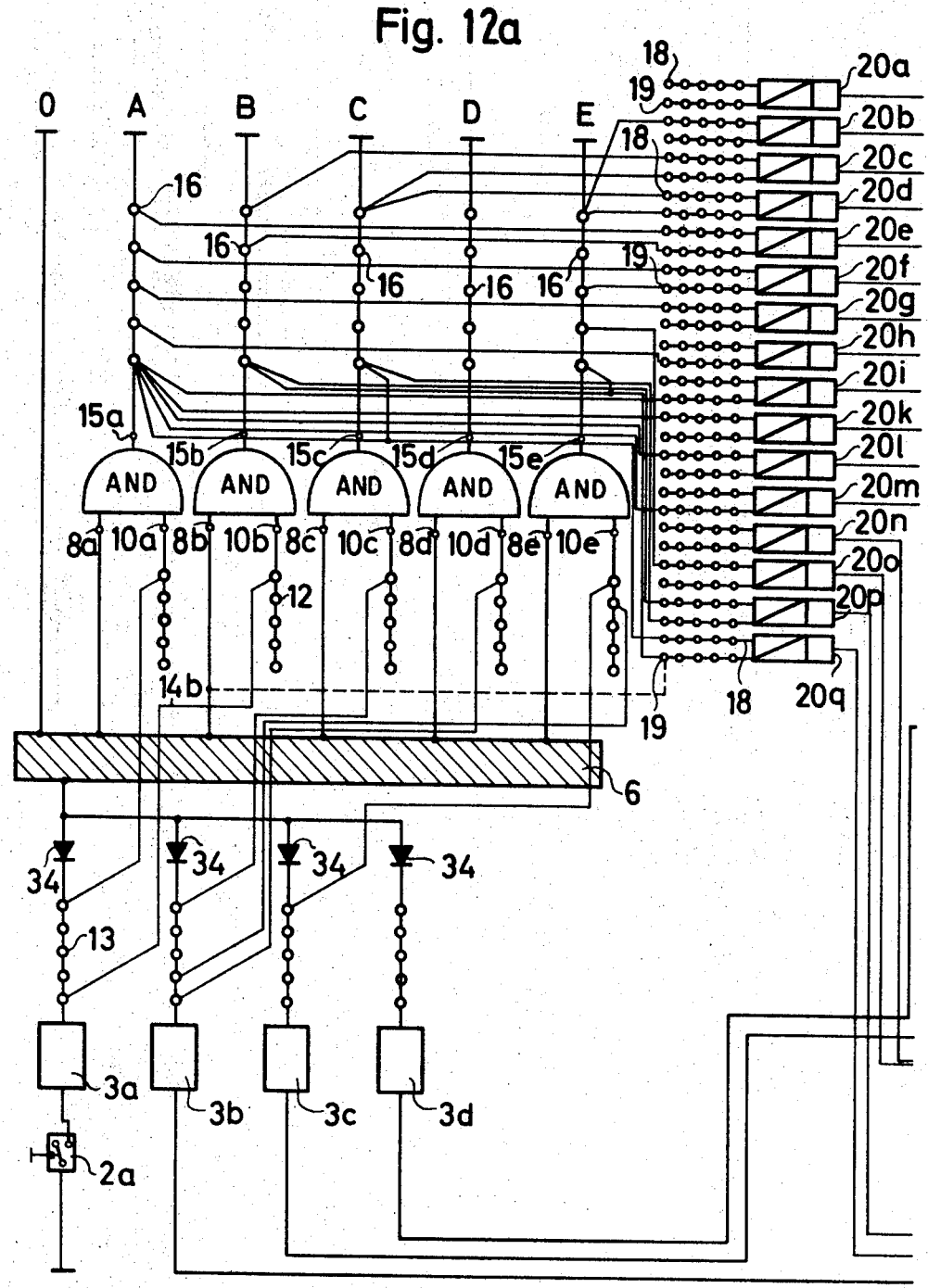
FIGS. 12a and 12b comprise a diagram illustrating the application of the control system according to FIG. 1 to a particular machine tool arrangement.
Figure 12B:
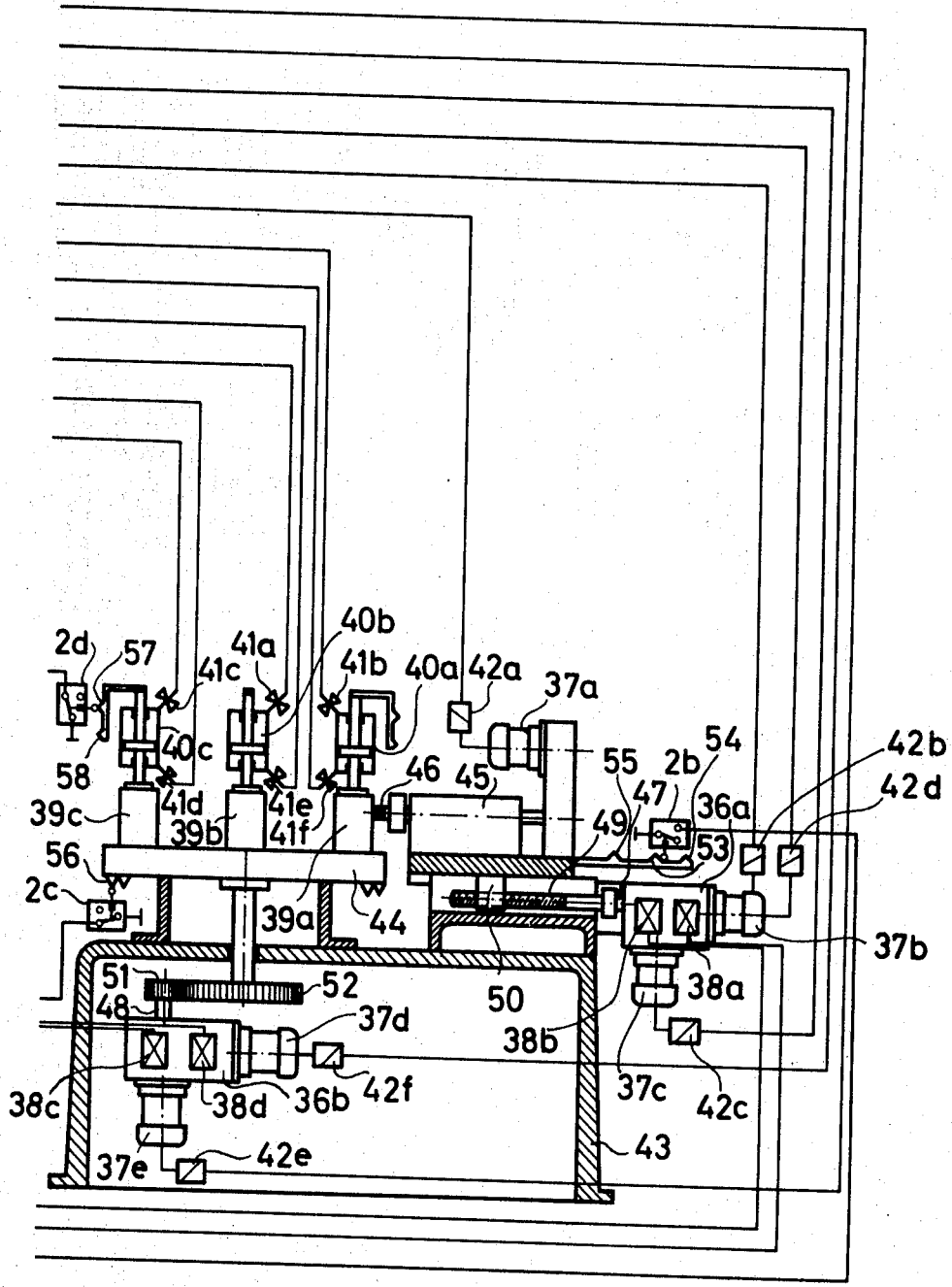

In order to facilitate understanding of the invention, a detailed description of an application of this control arrangement to a particular machine tool set-up as shown in FIGS. 12a and 12b, now follows. This is in no way to be considered as limiting the scope of the invention, since this control arrangement may be applied to a wide variety of systems, including machine tool set-ups, process control, etc.

An upright member 43 supports a turntable which is driven from one station to the next by gearing 36b. Identical gearing 36a drives a movable carriage 45, which carries a tool 46. Connected to gearing 36a is a high speed motor 37c and an advancing motor 37b. Correspondingly, a high speed motor 37e and an advancing motor 37d are connected to gearing 36b. These motors activate the output shafts 47 and 48 over electrical couplings 38a, 38b, 38c and 38d. The output shaft 47 of the gearing 36a is coupled to a threaded spindle 49, which causes the movable carriage to move back and forth by means of nut 50. Output shaft 48 of the turntable gearing 36a causes rotary motion of the turntable 44 by means of pinion 51 and gear 52. The tool 46, a spindle unit, is driven by motor 37a.

Rotary table 44 carries parts to be machined, namely 39a, 39b, 39c, etc., according to a prearranged pattern. Clamping power is derived from cylinders 40a, 40b and 40c, which may be driven hydraulically or pneumatically.

The phase sequence generated by the control arrangement may now proceed as follows:

(1) To start, switch 2a is depressed. This switch may be in the form of a locking switch, which stays locked until the locking mechanism is released manually, thus preventing accidental operation. The control voltage reaches the input of the monostable multivibrator 3a in the form of a D.C. voltage by means of the switching contacts of the switch 2a. The output signal of the monostable multivibrator 3a then consists of a standard pulse of a predetermined width, which advances counter 6 by one count. This removes the signal voltage which was previously at the zero input of the counter. The counting signal then appears at the counting output of the group designated A in FIG. 12a. This starts the first phase of the operating cycle. The signal appearing at one of second additional multiterminal interconnecting means here the plug-in units 16, group A, is the first activation signal. Plug-in units 16A which contain this first activation signal are then connected to storage means 20, as follows: To the set inputs of storage means 20f, 20e, 20q, 20k, 20g and 20l; and to the reset inputs 19 of the storage means 20m, 20h and 29i. Thus the first activation signal results in the activation of a relay 42a, a relay 42b, the coupling 38a, a valve 41a, a valve 41b and a valve 41d, while valves 41c, 41e, and 41f are deactivated, that is the pressure is removed from the corresponding side of the piston. Thus, the spindle drive motor 37a is activated, as is the high speed motor 37c for the carriage 45. The high speed coupling 38a is energized. The carriage 45 moves with rapid advance toward the part to be machined, 39a, which is tightly held under tension, since the valve 41b is activated and valve 41f is deactivated. The other parts to be machined are clamped in a similar fashion, while the part 39c is loose, since the valve 41c is deactivated and valve 41d is activated. This part, which has already been machined, may be removed in this phase and replaced by a new part.

(2) The rapid advance of the carriage 45 in the direction towards the part 39a continues until a cam 53 fastened to the carriage 45 activates switch 2b. By means of this switch, a control signal generating means, the control voltage reaches the monostable multivibrator 3b, at whose output a standard pulse appears and advances the counter 6 by another step. Thus, activation signal 2 appears at group B. The activation signal appears in group B only if the coincidence means 9 of this group are conductive. The input 8b of the coincidence means is connected to counter 6, the input 10b of the coincidence means is connected to the plug-in units 12 and thence to the plug-in units 13 at the output of the monostable multivibrator 3a.

Only if a counting signal appears at input 8b and simultaneously, a standard pulse at 10b does the second activation signal appear in the group B. The second activation signal, or the voltage appearing in group B, is connected with the set inputs of the storage means 20p and 20c as well as with the reset inputs of the storage means 20d and 20q. Thus, by means of the second activation signal, the high speed motor 37c and the high speed coupling 38a are disconnected and slow speed motor 37b and slow speed coupling 38b are set. The carriage 45 will thus approach the part to be machined 39a at a slow speed.

(3) This advance continues until the switch 2b is closed by a second cam 54 connected to the carriage 45. Monostable multivibrator 3b thus again generates standard pulse, causing the counter to davance from group B to group C. In this third counting step the counter output is connected with the input 8c of the coincidence means 9, and the input 10c is connected with the output of the monostable multivibrator 3b. Only when a signal appears simultaneously at the inputs 8c and 10c does the third activation signal, that is the voltage at group C appear. For this phase, the plug-in units 16 are connected with the set inputs of the storage means 20d and 20q, as well as with the reset inputs 19 of the storage means 20c and 20p. Thus, the relay 42c and the coupling 38b are disconnected and the relay 42d and the coupling 38a are activated. This causes the carriage 45 to stop, since the slow speed motor 37b and the coupling 38b have been disconnected. The carriage 45 then travels rapidly in the reverse direction since relay 42d causes the motor 37c and the coupling 38a to reverse direction.

(4) During the return of the carriage 45, the cam 53 again reaches switch 2b and depresses it, so that a standard pulse again appears at the output of the monostable multivibrator 3b which in turn advances the counter again. Input 8d of the coincidence means 9 in group D is connected to the counter output, the input 10d is again connected with the output of the monostable multivibrator 3b. The fourth activation signal, that is the voltage appearing in group D, will appear when there is a signal at inputs 8d and 10b simultaneously. To prevent spurious signals, all units having multiple inputs and outputs may be decoupled by diodes. Thus, there are diodes 34 at the outputs of the monostable vibrator 3. In group D, the plug-in units 16 are not connected with any set or reset inputs of the storage means 20 so that none of the cooperating members of the machine tool set-up are activated. Thus, the previous conditions continue and the return movement of the carriage continues. The necessity for this empty phase results from the cam 53 which is necessary for the first and second phases but must be by-passed at the fourth phase.

(5) As the return of the carriage 45 continues, the cam 55 finally activates switch 2b. Another standard pulse thus appears at the output of the multivibrator 3b, so that the activation signal is switched from group D to group E. The input 8e of the coincidence means 9 of the group E is connected with the counter output, while the input 10e is again connected to the output of the monostable multivibrator 3b. If a signal appears at both inputs 8e and 10e, then an activation signal appears at the plug-in unit 16 of group E. These plug-in units are connected to the set inputs 18 of the storage means 20b and 20o, as well as with the reset inputs 19 of the storage means 20f, 20d and 20q. As a result of voltage appearing at these inputs, the high-speed motor 37d of gearing 36b for the turntable 44 is activated over relay 42f as is the rapid advance coupling 38c. Relay 42a, 42d and coupling 38a are disconnected. In other words, the return of the motor is stopped, the work spindle is stopped, and the turntable rotates rapidly.

(6) The turning of turntable 44 changes from a rapid speed to a slow speed as its proper position is approached as soon as cam 56 depresses switch 2c. In similar fashion as described above, the activation signal appearing at the output of the coincidence means causes the further operation of the cooperating members of the machine tool set-up. The turntable is stopped, the finished part is freed by the cylinder. Cams 57 and 58 connected to the pistons of the cylinders cause the switching of a switch 2d. After the new part has been clamped by means of the activation signal started by the control signal emanating from switch 2d, all elements are ready for a repeat of the program which then takes place.

It must be repeated here that the particular advantage of the control arrangement of this invention lies in the fact that the coincidence means between the counter output and the following activation signal preclude the possibility of errors in the phase sequence. That is, such errors cannot occur even if a switch or an activator malfunctions, or if a switch is activated by error. In spite of this, the phase sequence may be freely altered to suit particular purpose. As an example, if in phase (1) in which the carriage 45 is moving forward rapidly, the switches 2c or 2d are activated accidentally, the counter would be advanced a step but no coincidence would exist so that no activation signal could appear at the outputs 15b, 15c, 15d or 15e of the coincidence means 9. But under these conditions, there would also be no change from rapid advance to the slower advance of the carriage as it activates switch 2b with cam 54. In order to eliminate this dangerous condition a locking arrangement may be used as indicated in FIG. 12 in a dashed line. Reset input 19 of the storage means 20q is thus connected not only to the activation signal of group B, but also to the corresponding counter output. Thus, in case of switching error, the carriage 45 is stopped and so is the further operation of the machine tool set-up, since no further signals will appear at outputs 15b, 15c, 15d and 15e. Finding the source of the error is also facilitated greatly due to the switching arrangement.

The advantages attained with this invention reside particularly in the fact that a reliable control arrangement with a long operating life results which requires only a minimum number of control signal generators. In spite of this, the choice of phase sequence is completely free and very concisely defined conditions will exist for each phase. If an error appears in any element of the control system, the machine will be stopped at the latest in the following phase, since the coincidence criterion will not be fulfilled. In this fashion, dangerous conditions at the machine may be avoided and self-contained error detection results. The control arrangement has substantially universal applicability since it may be increased or decreased according to a particular application and may equally well be used in a process control system. Since only static building blocks are used, no uncontrollable oscillations may occur, and the signal-to-noise ratio may be fixed at a sufficiently high level.

While the invention has been illustrated and described as embodied in a particular control arrangement for a machine tool set-up, it is not intended to be limited to the details shown, since various modifications and structural, circuit and component changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a system having cooperating members undergoing at least one operating cycle, said operating cycles having a plurality of phases of operation occurring in a predetermined order, a control arrangement, comprising in combination, a plurality of activating means, each for activating at least one of said cooperating members in response to an activation signal; a plurality of control signals in dependence on the phase in the operating cycle of one of said cooperating members; counting means for counting said control signals and generating counting signals at successive counting outputs, the appearance of a counting signal at a specified one of said counting outputs thus signifying the previous receipt of a corresponding number of control signals; a plurality of coincidence means corresponding in number to said counting outputs, each of said coincidence means having a first input connected to a corresponding one of said counting outputs, each of said coincidence means further having a second input, said coincidence means each being responsive to substantially simultaneous reception of a signal at each of its inputs and adapted to furnish an activation signal upon said simultaneous reception thus causing at least one of said activating means to activate its corresponding cooperating member; and connecting means interconnecting said control signal generating means and said second inputs of said coincidence means in such a manner that each control signal becomes effective in one or more phases of said operating cycle.

2. A system as set forth in claim 1, wherein said counting means comprise a counter having a plurality of ocunting steps.

3. A system as set forth in claim 1, wherein each of said coincidence means comprises three NOR gates.

4. A system as set forth in claim 1, also comprising a plurality of storage means connected between said coincidence means and said activating means, and wherein each of said storage means is connected to a corresponding one of said activating means.

5. A system as set forth in claim 4, wherein said storage means have a set condition adapted to cause the operation of said activating means, and a reset condition adapted to cause said activating means to stop operating.

6. A system as set forth in claim 5, wherein each of said storage means has a set input and a reset input, adapted to put said storage means in said set or reset condition respectively, upon receipt of an activation signal.

7. A system as set forth in claim 6, also comprising further multiterminal interconnecting means at each of said set and reset inputs of said storage means.

8. A system as set forth in claim 1, wherein said connecting means comprise multiterminal interconnecting means connected to said second input of said coincidence means.

9. A system as set forth in claim 8, wherein said connecting means also comprise additional multiterminal interconnecting means connected to the output of said control signal generating means.

10. A system as set forth in claim 1, also comprising second additional multiterminal interconnecting means connected at the outputs of said coincidence means.

11. A system as set forth in claim 1, also comprising additional decoupling diodes at said second inputs of said coincidence means.

12. A system as set forth in claim 1, further comprising a plurality of pulse generating means, each connected to one of said control signal generating means, and adapted to furnish a standard pulse upon receipt of a control signal.

13. A system as set forth in claim 12, wherein said pulse generating means comprise monostable multivibrators.

14. A system as set forth in claim 13, also comprising decoupling diodes at the output of each of said multivibrators.

References Cited

UNITED STATES PATENTS

| | | | |
|---|---|---|---|
| 3,074,632 | 1/1963 | Braun et al. | 235—132 |
| 3,098,187 | 7/1963 | Sciaky. | |
| 3,317,894 | 5/1967 | Jensen. | |
| 3,321,744 | 5/1967 | Jensen. | |

DONALD J. YUSKO, Primary Examiner

U.S. Cl. X.R.

340—168